US008316926B2

(12) United States Patent
Cheng et al.

(10) Patent No.: US 8,316,926 B2
(45) Date of Patent: Nov. 27, 2012

(54) ARRANGEMENT AND METHOD FOR AUTOMATICALLY DETERMINED TIME CONSTANT FOR A CONTROL DEVICE

(75) Inventors: George Shu-Xing Cheng, Folsom, CA (US); Osman Ahmed, Hawthorn Woods, IL (US); William Thomas Pienta, Prospect Heights, IL (US)

(73) Assignee: General Cybernation Group Inc., Rancho Cordova, CA (US)

( * ) Notice: Subject to any disclaimer, the term of this patent is extended or adjusted under 35 U.S.C. 154(b) by 1078 days.

(21) Appl. No.: 11/590,691

(22) Filed: Oct. 31, 2006

(65) Prior Publication Data

US 2007/0181701 A1    Aug. 9, 2007

Related U.S. Application Data

(60) Provisional application No. 60/731,889, filed on Oct. 31, 2005.

(51) Int. Cl.
| | |
|---|---|
| F25D 13/00 | (2006.01) |
| F24F 11/00 | (2006.01) |
| F28F 13/00 | (2006.01) |
| G05D 23/32 | (2006.01) |
| F25B 41/00 | (2006.01) |
| F25B 19/00 | (2006.01) |

(52) U.S. Cl. .......... 165/267; 165/239; 165/268; 62/157; 62/209; 62/231

(58) Field of Classification Search .................. 165/238, 165/239, 267, 268, 270; 236/46 R, 46 A, 236/46 C, 46 F, 49.3; 454/229, 239; 62/157, 62/231, 209
See application file for complete search history.

(56) References Cited

U.S. PATENT DOCUMENTS

| | | | | |
|---|---|---|---|---|
| 5,172,565 | A * | 12/1992 | Wruck et al. | 62/177 |
| 6,047,557 | A * | 4/2000 | Pham et al. | 62/228.5 |
| 2003/0153986 | A1* | 8/2003 | Salsbury et al. | 700/11 |
| 2003/0160104 | A1* | 8/2003 | Kelly et al. | 236/91 C |
| 2004/0256473 | A1* | 12/2004 | Hull et al. | 236/49.3 |
| 2005/0006487 | A1* | 1/2005 | Suda et al. | 236/46 R |
| 2005/0172647 | A1* | 8/2005 | Thybo et al. | 62/129 |
| 2006/0032245 | A1* | 2/2006 | Kates | 62/129 |

* cited by examiner

Primary Examiner — Ljiljana Ciric
Assistant Examiner — Travis Ruby

(57) ABSTRACT

An arrangement for use in connection with an air handling unit includes a controller and a processing circuit. The controller is configured to control a device within an air handler unit, which includes at least a first coil. The processing circuit is configured to receive first information representative of a maximum liquid flow rate through the first coil and second information representative of a maximum air flow rate of the first coil. The processing circuit is further configured to generate a time constant estimate, based on the first information and second information, for use in the controller in performing control of the device.

25 Claims, 11 Drawing Sheets

ARRANGEMENT AND METHOD FOR AUTOMATICALLY DETERMINED TIME CONSTANT FOR A CONTROL DEVICE

This application claims the benefit of U.S. provisional patent application Ser. No. 60/731,889, filed Oct. 31, 2005 and which is incorporated herein by reference.

FIELD OF THE INVENTION

The invention relates generally to control arrangements in an air handling unit of a building system, particularly those that require time constants for performing control operations.

BACKGROUND

Control arrangements are used in a variety of applications, including but not limited to various elements of a building comfort system, or heating, ventilation, air conditioning ("HVAC") system. One device within an HVAC system is an air handling unit.

An air handling unit is typically known as a device that blows heated or chilled air through the ventilation system of a building. A typical air handling unit includes a fan (or other air moving device) and heating and/or cooling coils. The coils are designed to receive a heating material such as steam or hot water, or cooling material such as chilled water or other coolant. The coils thus heat or chill the air as needed before it is blown through the ventilation system. In summer, the air handling unit may blow cool air through the ventilation system by receiving chilled water into a coil and then drawing the air to be blown over the coil. In winter, the air handling unit blows heated air through the ventilation system by receiving heated water or steam into a coil and then drawing the air to be blown over the coil.

As with many devices that operate within a building system, the air handling unit is a dynamic system. In any dynamic system, there is a transition time between its input and output signals. The transition time it takes for the output to reach about 63% of its steady-state value due to a step change in the input is called Time Constant. In a dynamic system where the output always needs some transition time to reach its steady state, there will always be a Time Constant. For example, if a heating system can respond to a step input to raise the temperature of a house by 3 degrees, then the time constant is the time it takes for the house to change by 3 times 63% or 1.89 degrees.

In addition to the time constant, other parameters that express the dynamics of a physical system are known as the static gain and delay time. The static gain, time constant, and delay time together provide information that allow a controller such as a PID or PI controller to be tuned. Tuning controllers based on the static gain, time constant, and delay time of the physical system to be controlled is known in the art.

Thus, when a control system is being initially configured or installed, it is advantageous to obtain the static gain, time constant, and delay time of that system so that the controller may be properly tuned. While some known advanced control schemes can adapt to the changes in operating conditions, they still often require some initial settings including at least a time constant for the system.

In order to obtain the time constant of a particular device, specific tests on the device, such as a "bump" test, are performed. One type of bump test providing a step value input is provided to a device or system, which eventually causes the system to change from an initial measurable output A to a final measurable output B. The time of the transition from output A to output B is measured, with the time constant being identified as the time it takes for the device or system output to achieve 63.1% of the change from output A to output B.

Such bump tests have often been used to determine the time constants associated with the supply air temperature control processes of an air handling unit. As is known in the art, a typical air handling unit may alter the temperature of the supply air in a number of ways, including using heating and/or cooling coils, or admitting more (cooler or warmer) outside air into the building. Each of those supply air temperature control processes has its own time constant. Prior art bump tests involve forcing the air handling unit to change the temperature using each of these processes, and determining the response time.

Bump tests have a disadvantage in that they are relatively time consuming, are labor intensive, and require technical expertise. The system is typically tested after installation. Thus, costly tests and expertise are needed on a job-site to program parameters into a control system that involves an air-handling unit.

There is a need, therefore, for a method or apparatus that reduces the amount of testing and expertise required to develop a time constant estimate for an air handling unit.

SUMMARY OF THE INVENTION

At least some embodiments of the invention address the above-described needs, as well as others, by providing a method of automatically calculating a time constant for an air handling unit subsystem, and or an arrangement that automatically calculates and uses a time constant in connection with an air handling unit control system.

A first embodiment of the system is an arrangement that includes a controller and a processing circuit. The controller is configured to control a device within an air handler unit, which includes at least a first coil. The processing circuit is configured to receive first information representative of a maximum liquid flow rate through the first coil and second information representative of a maximum air flow rate of the first coil. The processing circuit is further configured to generate a time constant estimate, based on the first information and second information. The time constant is used in the controller in performing control of the device.

The above described features and advantages, as well as others, will become more readily apparent to those of ordinary skill in the art by reference to the following detailed description and accompanying drawings.

DETAILED DESCRIPTION

Figure 1:
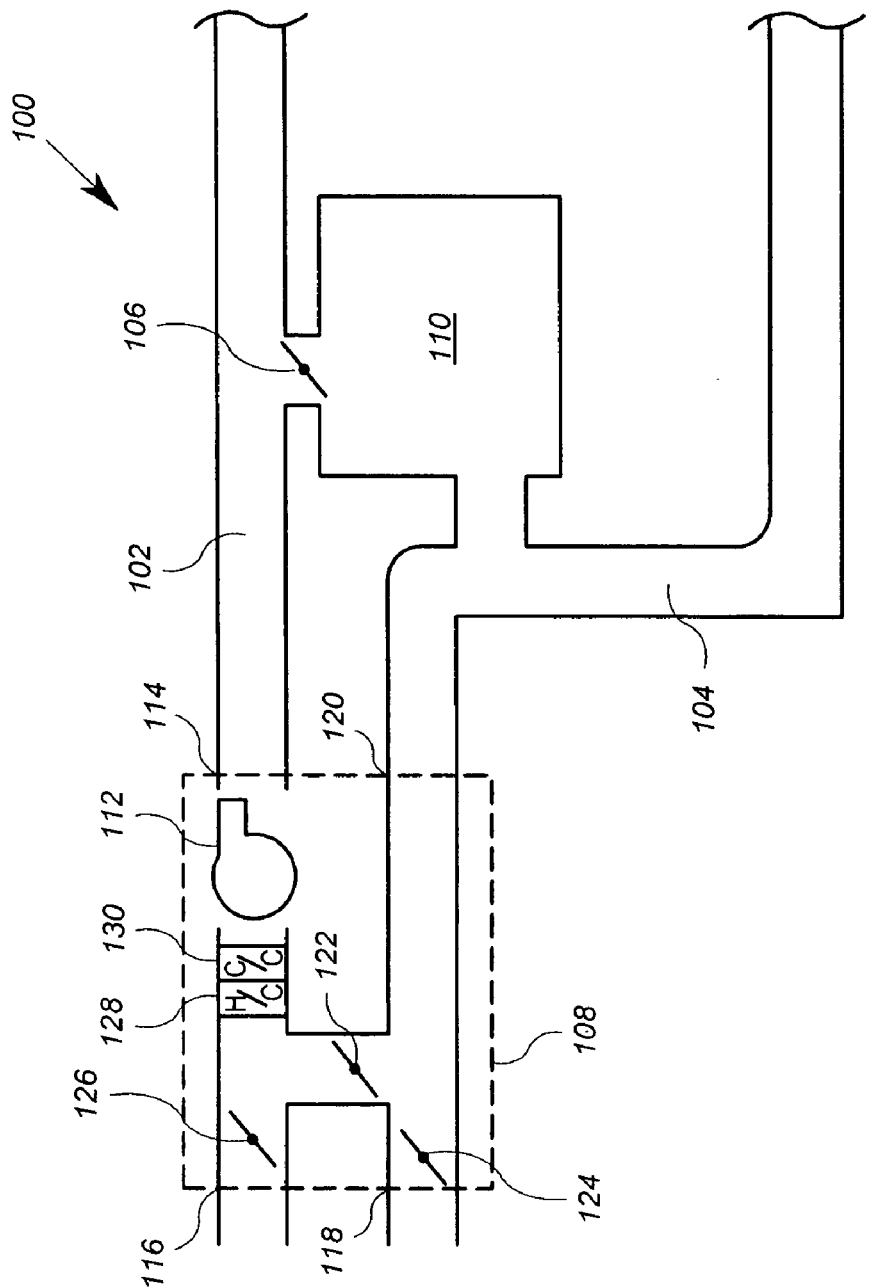
FIG. 1 shows a portion of an exemplary HVAC system that includes an air handling unit which may be controlled in accordance with one or more embodiments of the invention.

FIG. 1 shows a portion of an exemplary HVAC system 100 that includes an air handling unit 108 which may be controlled in accordance with one or more embodiments of the invention. The portion of the HVAC system 100 illustrated in FIG. 1 includes a supply duct 102, a return path 104, a first room damper system 106, and an air handling unit 108. The HVAC system 100 provides heated, chilled and/or fresh air throughout a building having a multiplicity of zones, spaces and/or rooms. In FIG. 1, only a first room 110 is shown for purposes of clarity of exposition. However, it will be appreciated that the facility or building may contain several other rooms, spaces and or zones, and that the HVAC system 100 will contain several other elements known in the art.

The air handler unit 108 is a device that advances air flow through some or all of the HVAC system 100. Some buildings have multiple air handling units. The air handler unit 108 of FIG. 1 includes a supply fan 112, a supply air outlet 114, a fresh air inlet 116, an exhaust 118, a building return inlet 120, a recirculation damper 122, an exhaust damper 124, an outdoor damper 126, a heating coil 128 and a cooling coil 130. In this embodiment, the supply fan 112 is upstream of, and in fluid communication with, the supply air outlet 114. The supply air outlet 114 interfaces to the supply duct 102 of the system 100. The cooling coil 130 is upstream of, and in fluid communication with, the supply fan 112, and the heating coil 128 is upstream of the cooling cool 130.

The outdoor inlet 116 is in fluid communication with the outdoor atmosphere, and serves as a source of fresh air to the HVAC system 100. The outdoor inlet 116 is located upstream of the heating coil 128 (and thus also the supply fan 112) and is connected to the heating coil via the outdoor air damper 126.

The building return inlet 120 is connected to the return path 104 of the building. The return path 104, which may suitably be the plenum space above building ceilings, extends throughout the building and is configured to receive "spent" or exhaust air from various rooms and spaces. The building return inlet 120 is upstream of both the building exhaust 118 and the heating coil 128. The building return inlet 120 is in fluid communication with the building exhaust 118 via the exhaust damper 124, and is in fluid communication to the heating coil 128 via the recirculation damper 122. The building exhaust 118, like the outdoor air inlet 116, is in fluid communication with the outdoor atmosphere. However, the building exhaust 118 provides an egress port for spent or stale air from the building.

In general, the air handling unit 108 is operable to supply air to the supply duct 102. The supplied air may be heated, chilled, and may include some mixture of fresh air and recirculated air. The air handling unit 108 supplies chilled air when the temperature of relevant portions of the building needs to be lowered, and supplies heated air when the temperature of relevant portions of the building needs to be raised. However, in some cases, other heating and cooling elements may be used to effect temperature changes in localized areas, even though those areas are coupled to receive air heated or chilled by the air handling unit 108.

The supply air flows from the air handling unit 108 through the supply duct 102, and may be tapped off at various portions of the building, including by way of example, the first room 110. The supply duct 102 is coupled to the first room 110 via a ventilation damper 106. Other rooms and areas, not shown, are coupled to receive supply air from the supply duct 102 in a similar manner. The ventilation damper 106 is used to regulate the amount of supply air that is provided to the room 110. The amount of heated or chilled supply air that is provided to the room 110 is dependent upon the sensed temperature of the room 110, the desired temperature of the room 110, the temperature of the supply air in the supply duct 102, the air flow in the supply duct 102, and the need for fresh air in the room 110. Control systems that determine the position and operation of the ventilation damper 106 are well known in the art.

The supply air provided to the various rooms and spaces of the building creates the need to return exhaust air via the return path 104. Each room or space is operably connected to provide exhaust air to the return path 104. (See e.g., the room 110). The return air to the outdoor exhaust 118, back to the heating coil 128 for recirculation, or a combination of both. The amount of exhaust air that is recirculated, and the amount that exits via the building exhaust 118, is controlled by the dampers 122 and 124.

The outdoor air inlet 116 provides air to the heating coil 128 in varying degrees, depending on the amount of exhaust air that is recirculated via recirculation damper 122. The mix of recirculated exhaust air and fresh outdoor air that is provided to the heating coil 128 (and thus to the cooling coil 130 and supply fan 112) is controlled by the recirculation damper 122 and the outdoor air damper 126.

The heating coil 128 is a device that is operable to perform a heat exchange between a heating medium such as water or steam, and the air flowing to the supply fan 112. To this end, the heating coil 128 has a conduit configured to receive a liquid or steam heating medium. This conduit, not shown, is disposed in a heat exchange area. Such devices are known in the art. The heating coil 128 has an associated valve actuator, not shown in FIG. 1, that controls the flow of the heating medium into the coil 128. Thus, when heating is needed, the heating medium is allowed to advance into the heating coil 128. The heat exchange takes place through the transfer of heat from the heating medium to the supply air being drawing through the coil 128 by the supply fan 112.

The cooling coil 130 is a device operable to perform a heat exchange between a cooling medium such as liquid coolant, and the air flowing to the supply fan 112. Like the heating coil 128, the cooling coil 130 has an associated valve actuator, not shown in FIG. 1, that controls the flow of the cooling medium into the coil 130. Thus, when cooling is needed, the cooling medium is allowed to advance into the cooling coil 130. The heat exchange may then take to transfer heat from the supply air, thereby cooling the supply air.

In operation, the air handling unit 108 is associated with, or contains, a controller that controls the operation of the dampers 122, 124 and 126, and operation of the coils 128 and 130. The controller, which may for example be the controller 150 of FIG. 2, discussed below, controls the dampers 122, 124 and 126 and the coils 128 and 130 to selectively heat or chill the supply air that is provided to the supply duct 102 by the supply fan 112. For example, if the supply air must be warmer, then the heating coil 128 may be filled with the heating medium (steam or hot water). If the outside air temperature is warmer than the exhaust air, then the dampers 122, 124 and 126 may be manipulated to allow more outside air into the mixture that becomes the supply air.

Various schemes for controlling the supply air temperature are known, using dampers configured as shown in FIG. 1, and using heating and cooling coils as shown in FIG. 1. These schemes include PI control, PID control and even adaptive controls such as the MFA control scheme taught in U.S. patent application Ser. No. 10/857,520, published as U.S. Patent Publication No. 2005/0004687, which is incorporated herein by reference. An example of another control scheme based on ordinary PI control that is adapted for an air handling unit is shown in U.S. Pat. No. 5,791,408, which is incorporated herein by reference.

As discussed further above, one feature of each of the above referenced control schemes is that they must be at least roughly tuned to the physical system of the air handling unit. As is known in the art, proper tuning of the control feedback algorithms usually requires at least an estimate of the gain of the system and the time constant of the physical system being controlled. In accordance with aspects of the present invention, the time constants for the supply air temperature control processes are determined using system specifications and, in some cases, reasonable estimation. Thus, complex testing, such as "bump" testing, is not required to determine the system time constants relating to supply air temperature control.

The determination of the system time constants as described herein is particularly useful in connection with an MFA controller as taught by U.S. patent application Ser. No. 10/857,520. In that controller, the gain is automatically tuned by the MFA controller, and therefore may be set with an initial arbitrary value, for example, the value of 3. Accordingly, to prepare an MFA controller designed for the AHU 108 of FIGS. 1 and 2, a time constant estimated using the techniques described herein and the arbitrary gain value (e.g. 3) may be provided to the MFA controller. The controller 150 would then be effectively ready for operation without bump testing.

Figure 2:
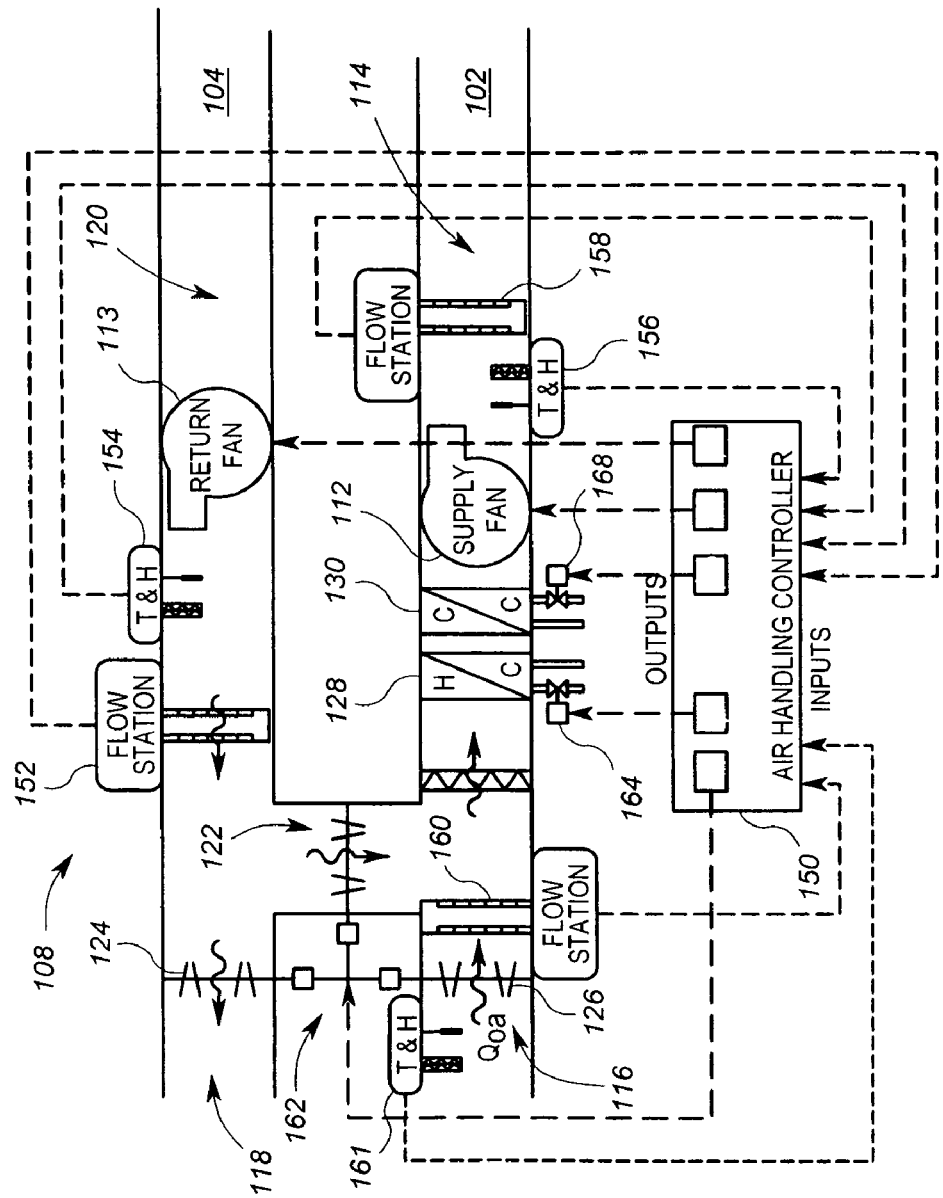
FIG. 2 shows in further detail an exemplary embodiment of the air handling unit of FIG. 1.

FIG. 2 shows in further detail an exemplary embodiment of the air handling unit 108 that shows more of the control circuits and elements that manipulate the dampers 122, 124 and 126 and the heating and cooling coils 128 and 130, respectively. Like elements from FIG. 1 will have like reference numbers.

As shown in FIG. 2, the air handling unit 108 further contains a return fan 113, a controller 150, a number of sensors that provide feedback information to the controller 150, and a number of actuators that effect system outputs responsive to control signals generated directly or indirectly by the controller 150. The sensors of the air handling unit 108 include a return flow sensor 152, a return air temperature and humidity ("T&H") sensor 154, a supply T&H sensor 156, a supply flow sensor 158, an outdoor inlet flow sensor 160, and an outdoor T&H sensor 161. The actuators of the air handling unit 108 include a set of damper actuators 162, a heating coil valve actuator 164 and a cooling coil valve actuator 168.

The return flow sensor 152 is arranged in the proximity of the return air inlet 120 to measure the flow of the exhaust air. The return air temperature sensor 154 is arranged in the same area, in order to obtain a measure of the exhaust air temperature. The supply temperature sensor 156 is generally affixed at the supply air outlet 114, downstream of the supply fan 112, the heating coil 128 and the cooling coil 130. The supply flow sensor 158 is similarly situated to measure the supply air flow downstream of the supply fan 112. The outdoor inlet flow sensor 160 is disposed just down stream of the outdoor air damper 126 and the outdoor air temperature sensor 161 is situated just upstream of the outdoor air damper 126, near the outdoor air inlet 116.

The set of damper actuators 162 are operably connected to control the position of the outdoor air damper 126, the exhaust damper 124, and the recirculation damper 122. The heating coil valve actuator 164 is operably connected to control the flow of the heating medium (e.g. hot water or steam) into (i.e. through) the heating coil 128, and the cooling coil valve actuator 168 is operably connected to control the flow the cooling medium into the cooling coil 130.

The air handling unit 108 thus includes many devices having various process outputs. Many of the functions of the air handling unit 108 are known in the art and discussion thereof is not necessary for exposition of the invention. However, common controlled processes of the air handling unit 108 include control of the static pressure in the supply duct 104, control of the return air flow in the return air inlet 114, and control of the supply air temperature TS. Control schemes for determining and regulating such variables are known in the art, and vary from building to building. In general, the air handling unit 108 receives set points for supply duct static pressure and/and or return air flow, as well as for supply air temperature. These set points are typically generated in coordination with other control processes in the building, as is known in the art.

The supply duct air pressure is controlled, at least in part, by controlling the supply fan 112. The controller 150 uses feedback from the supply flow sensor 158 as well as other information to determine whether the supply duct air pressure is at or near a desired point. The return air fan 113 is used to control the return air flow. Feedback from the return air flow sensor 152 is used to determine whether the return flow is at or near a desired value. Various methods for controlling the supply fan 112 and return fan 113 are known, and not provided in detail herein.

In a similar manner, the air handling unit 108 controls the supply air temperature such that the temperature detected by the supply air temperature sensor 156 is near or equal to a desired supply air temperature. The supply air temperature may be altered by appropriately manipulating the actuators 164, 168 and the damper actuators 162 to achieve or nearly achieve a desired supply temperature. In general, the supply air temperature TS may be increased by adding warmer outside air, or operating the heating coil 128. The supply air temperature TS may be decreased by adding cooler outside air, or operating the cooling coil 130.

Thus, the controller 150 uses these processes, and typically a mixture of these processes, to control the temperature of the supply air. As discussed above, there are various methodologies for controlling these processes using feedback provided by the supply air temperature sensor 156.

Figure 3:
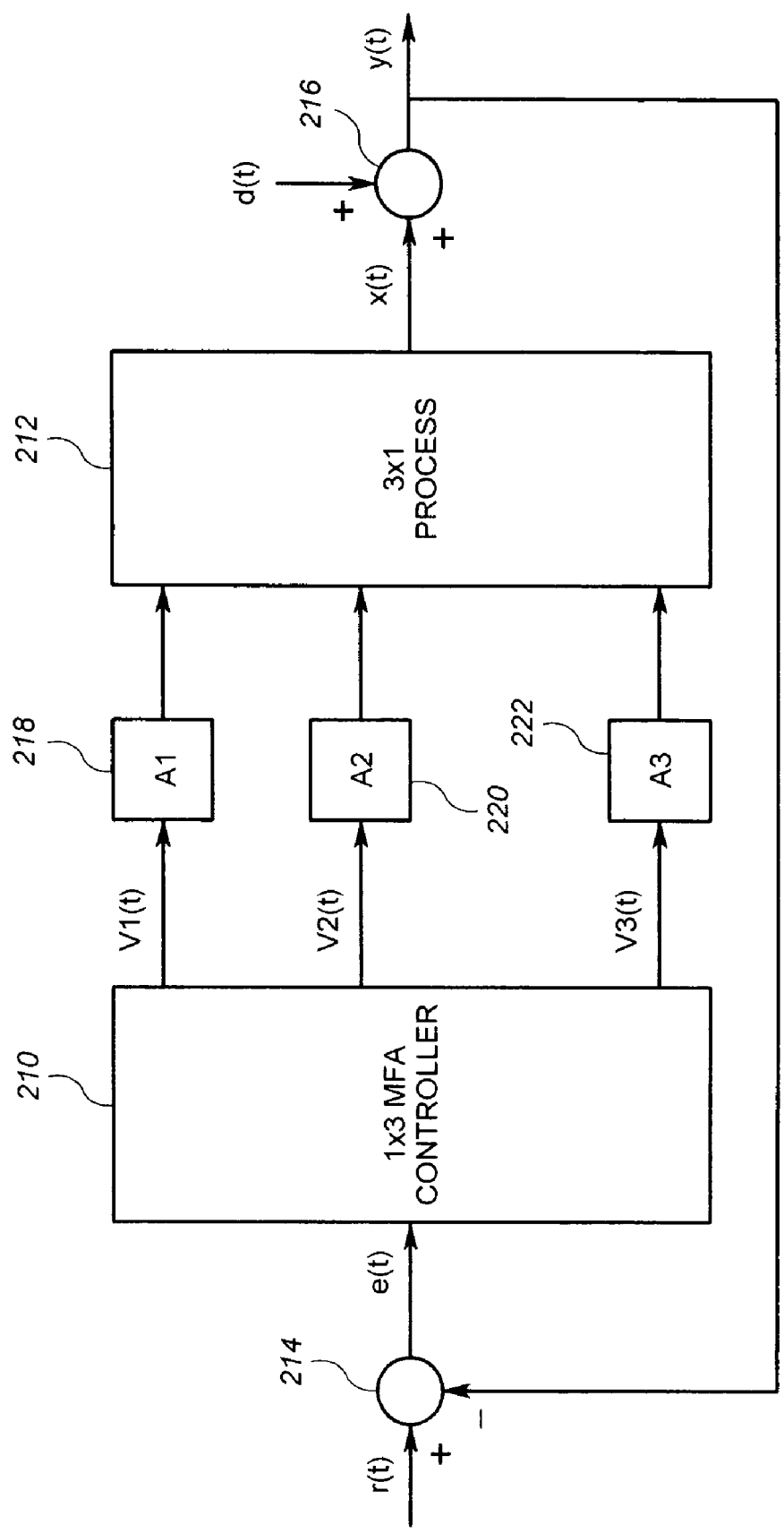
FIG. 3 is a block diagram illustrating schematically an air handling unit supply air process with a 1-input-3-output (1×3) model-free adaptive (MFA) controller that controls a 3-input-1-output (3×1) system with three actuators.

The model of the overall supply air temperature control process is generally shown in FIG. 3. The example of FIG. 3 employs an MFA controller 210. Since the building types, sizes, climate, seasons, loads, and environment vary, the supply air temperature process can be nonlinear and have a varying process static gain, time constant, and delay time. To control this complex process, PID (proportional-integral-derivative) type of controllers must be either tuned to a compromised set of parameters or frequently re-tuned. Model-Free Adaptive (MFA) controllers as described in U.S. Pat. No. 6,055,524, U.S. Pat. No. 6,556,980, U.S. Pat. No. 6,360,131, U.S. Pat. No. 6,684,115 B1, U.S. Pat. No. 6,841,112 B1, U.S. application Ser. No. 10/857,520, have the ability to adapt to changing conditions. Thus, the MFA based AHU control system provides consistent control performance in all operating conditions and does not require manual tuning or re-tuning of the controller parameters.

However, it will be appreciated that the same process may be implemented with a PI or PID controller, provided that another method is used to estimate or obtain the system gain.

In a typical system such as the AHU 108 of FIG. 1, we can consider that there are three sub-processes in a supply air temperature control system: the damper process, heating process, and cooling process. The heating process uses the various elements, including the heating coil 128, to generate heated supply air. The cooling processing uses various elements, including the cooling coil 130, to generate cooled or chilled supply air. The damper process involves manipulating the dampers 122, 124 and 126 to increase or decrease the proportion or ratio of outside air to recycled air.

In the MFA controller embodiment, there are four primary parameters for configuring the controller 150 for the supply air temperature: controller gain, damper time constant, heating time constant, and cooling time constant. Since the Model-Free Adaptive (MFA) controllers have strong adaptive capabilities and wide robust ranges, the controller gain can be set using a default value and the process time constants can be entered using roughly estimated values. As will be discussed below, the process time constant for the heating, cooling, and damper processes may be automatically determined based on the maximum or design air flow rate and the maximum or design water flow rate which are readily available in the AHU design documents and computer database. The process time constant may be used for other purposes, such as in another type of controller.

Without having to build process mathematical models or perform process bump tests, the techniques described below are also useful for automatically estimating the time constant parameters for other processes such as the mixed air temperature for the MFA controllers used for AHU control so that such MFA controllers can be automatically configured and launched without human interaction.

Multi-Input-Single-Output (MISO) MFA Control System

FIG. 3 shows a schematic of a general AHU control system 200 that includes a controller, process devices, and a system.

As illustrated in FIG. 3, a 3-input-1-output (3×1) MFA control system comprises a 1-input-3-output (1×3) MFA controller 210, a 3-input-1-output (3×1) process 212, actuators $A_1$ 218, actuator $A_2$ 220, actuator $A_3$ 222, and signal adders 214, 216. By way of example, the actuator $A_1$ 218 may be the actuator 162 of FIG. 2. Similarly, the actuator $A_2$ 220 may be the actuator 164 of FIG. 2, and the actuator $A_3$ 222 may be actuator 168 of FIG. 2. The process may suitably be the air flow process through the various elements of the air handling unit 108 shown in FIG. 2. The value of x(t) may suitably be obtained by the temperature sensor 156 of FIG. 2.

The signals shown in FIG. 1 are as follows:

r(t)—Setpoint.
y(t)—Process Variable, y(t)=x(t)+d(t).
x(t)—Process Output.
$V_1(t)$—Controller Output 1 to manipulate Actuator $A_1$.
$V_2(t)$—Controller Output 2 to manipulate Actuator $A_2$.
$V_3(t)$—Controller Output 3 to manipulate Actuator $A_3$.
d(t)—Disturbance, the disturbance caused by noise or load changes.
e(t)—Error between the Setpoint and Measured Variable, e(t)=r(t)−y(t).

The control objective is for the controller 210 to produce outputs $V_1(t)$, $V_2(t)$ and $V_3(t)$ to manipulate actuators $A_1$, $A_2$ and $A_3$ so that the measured variable y(t) tracks the given trajectory of its setpoint r(t) under variations of setpoint, disturbance, and process dynamics. As will be discussed below, the controller 210 generates the outputs based on tuning provide at least in part by a time constant for the system 212 that is generated in accordance with one or more embodiments of the invention.

FIGS. 4 through 8 show exemplary embodiments and variants of the general case of FIGS. 2 and 3, including those with more or less actuator and/or sub-processes.

3-Input-1-Output (3×1) MFA Control System for Air Handling Unit

Figure 4:
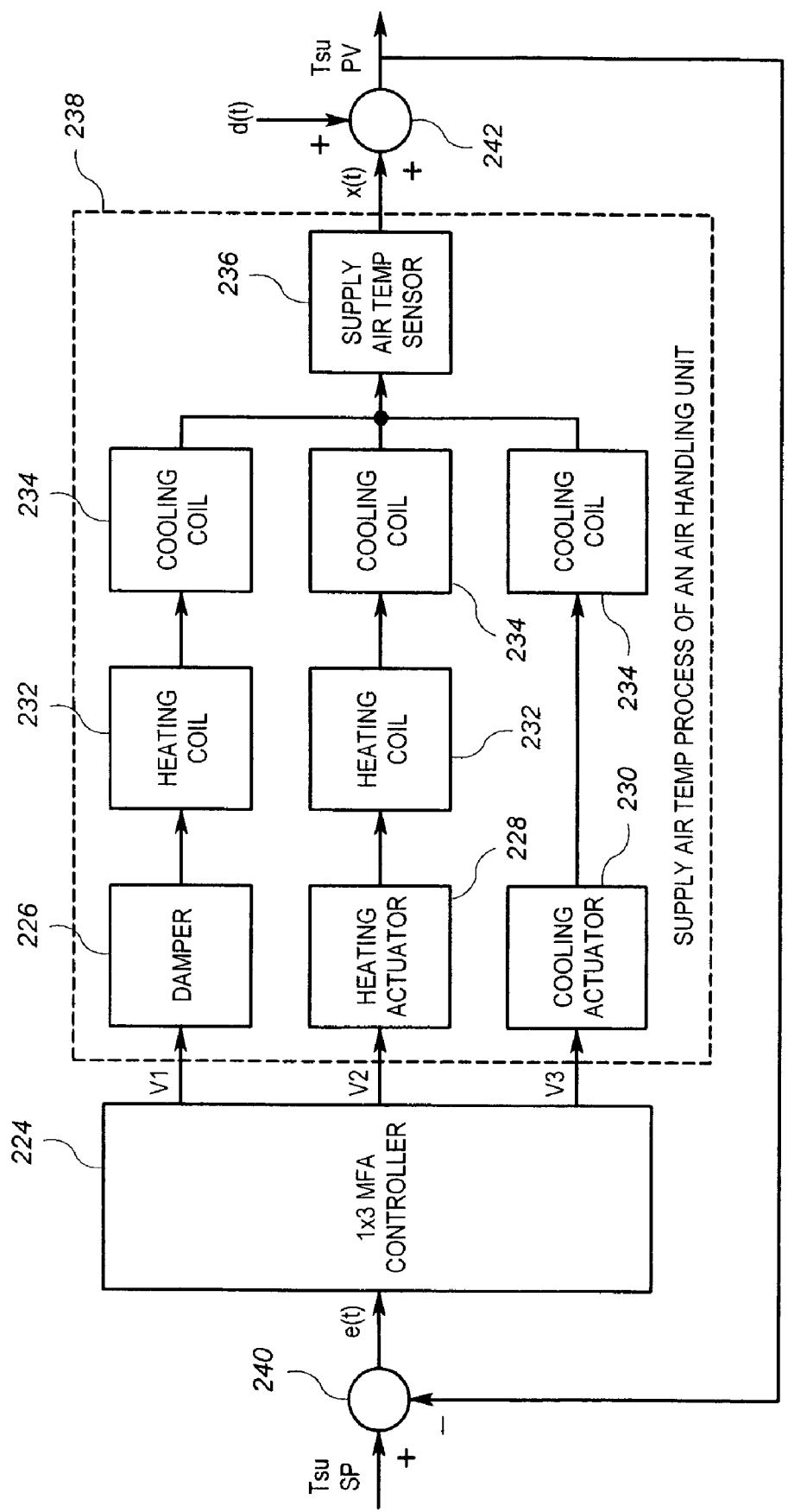
FIG. 4 is a block diagram illustrating schematically a 1-input-3-output (1×3) model-free adaptive (MFA) control arrangement that controls the supply air temperature of an air handling unit comprising a damper, a heating actuator, a cooling actuator, a heating coil, a cooling coil, and a temperature sensor.

FIG. 4 is a block diagram illustrating a 3-input-1-output (3×1) MFA control system that comprises a 1-input-3-output (1×3) model-free adaptive (MFA) controller 224, a 3-input-1-output (3×1) supply air temperature process of the air handling unit 238, and signal adders 240, 242. The supply air temperature process 238 further comprises a damper 226, a heating actuator 228, a cooling actuator 230, a heating coil 232, a cooling coil 234, and a temperature sensor 236. The example of FIG. 4 fairly represents the control schematic for the supply air process for the air handling unit 108 of FIG. 2.

As discussed further above, the supply air process may be represented as three subprocesses in this embodiment, a damper process, a heating process, and a cooling process. Each subprocess corresponds to the device actuator that is controlled. For example, in the damper process, the damper actuator 226 receives an actuator control signal V1, and in the cooling process, the cooling actuator 230 receives the actuator control signal. Each subprocess has its own time constant owing to the architecture of the air handling unit, wherein air may flow through multiple devices other than the device that is being controlled. For example, in the heating process, the heating actuator 228 receives the actuator signal, but the time constant is affected by the heating actuator time constant, the heating coil time constant, the cooling coil time constant, and the temperature sensor time constant. (See e.g., architecture of the AHU 108 of FIG. 2).

The signals shown in FIG. 4 are as follows:

Tsu SP—Setpoint of the supply air temperature.
Tsu PV—Process Variable of the supply air temperature, Tsu PV=x(t)+d(t).
x(t)—Process output.
$V_1$—Controller output 1 to manipulate the damper 226.
$V_2$—Controller output 2 to manipulate the heating actuator 228.
$V_3$—Controller output 3 to manipulate the cooling actuator 230.
d(t)—Disturbance, the disturbance caused by noise or load changes.
e(t)—Error between the Setpoint and Process Variable, e(t)=Tsu SP−Tsu PV.

The control objective is for the controller to produce outputs $V_1$, $V_2$ and $V_3$ to manipulate the actuators so that the Process Variable of the supply air temperature tracks the given trajectory of its Setpoint under variations of setpoint, disturbance, and process dynamics. It is noted that the "signal" lines between elements within the air handling unit 238 represent the supply air flow itself, not electrical signals.

For this 1-input-3-output (1×3) model-free adaptive (MFA) controller, there are four important controller parameters as follows:

$K_c$—Controller gain,
$T_{cd}$—Damper process time constant,
$T_{ch}$—Heating process time constant,
$T_{cc}$—Cooling process time constant.

Since the Model-Free Adaptive (MFA) controller 224 is adaptive, the controller gain $K_c$ can be set using a default value and no manual tuning of this parameter is required after the controller 224 is launched. For instance, we can set $K_c=3$ as the default value when configuring the MFA controller 224. On the other hand, the time constants $T_{cd}$, $T_{ch}$, and $T_{cc}$ need to be set relatively accurately since they are related to the dynamic behavior of the damper, heating, and cooling processes. In the embodiment described herein, each of the time constants $T_{cd}$, $T_{ch}$, and $T_{cc}$ is estimated at least in part based on physical parameters of the system, such as the maximum hot water flow rate through the heating coil 232 and/or the maximum chill water flow rate through the cooling coil 234.

In building automation applications, the size of the air handling unit 238 including the damper(s) 226, heating coil 228, and cooling coil 230 is designed based on the volume of the building space that the AHU system services and the thermal load on the building space. The information about the maximum or the design air flow rate, hot water flow rate, and chill water flow rate is readily available in the design document and saved in a computer database. Therefore, time constants based on the AHU design information can be automatically generated for the MFA controller configuration procedure to save time and manpower.

In this embodiment, it is advantageous to estimate the time constants for damper, heating process, and cooling process based on the following formulas:

$$T_{cd} = T_{damper\ actuator} + T_{heating\ coil} + T_{cooling\ coil} + T_{temp\ sensor}, \quad (1)$$

$$T_{ch} = T_{heating\ actuator} + T_{heating\ coil} + T_{cooling\ coil} + T_{temp\ sensor}, \quad (2)$$

$$T_{cc} = T_{cooling\ actuator} + T_{cooling\ coil} + T_{temp\ sensor}, \quad (3)$$

$$T_{heating\ coil} = c_1 \frac{F_{air}}{F_{hw}}, \quad (4)$$

$$T_{cooling\ coil} = c_2 \frac{F_{air}}{F_{cw}}, \quad (5)$$

where $T_{cd}$—Damper process time constant,
$T_{ch}$—Heating process time constant,
$T_{cc}$—Cooling process time constant,
$T_{damper\ actuator}$—Stroke time of the damper actuator,
$T_{heating\ actuator}$—Stroke time of the heating actuator,
$T_{cooling\ actuator}$—Stroke time of the cooling actuator,
$T_{temp\ sensor}$—Time constant of supply air temperature,
$T_{heating\ coil}$—Time constant of the heating coil,
$T_{cooling\ coil}$—Time constant of the cooling coil,
$F_{air}$—Maximum or design air flow rate,
$F_{hw}$—Maximum or design hot water flow rate,
$F_{cw}$—Maximum or design chill water flow rate,
$c_1$—Constant depending on the units of $F_{air}$ and $F_{hw}$,
$c_2$—Constant depending on the units of $F_{air}$ and $F_{cw}$.

As illustrated in the example AHU 108 of FIGS. 1 and 2, there are usually three dampers in an AHU system: outside air damper (OAD), return air damper (RAD), and exhaust air damper (EAD). (See dampers 126, 122 and 124, respectively, of FIGS. 1 and 2). Most of the time the three dampers work in unison with the return air damper opening as the exhaust and outside air dampers close. Basically, the system is either bringing in outside air and exhausting an equivalent amount, or it is recirculating the inside air, or doing something in between using intermediate positions. These three dampers are sometimes referred to as mixed air dampers. From a control system point of view, we can treat them as only one damper, e.g. damper 226 of FIG. 4 that the controller output manipulates.

The damper time constant by itself is small in value—typically it equals damper actuator stroke time plus the temperature sensor time constant. However, since the air from the three dampers must go through the heating and cooling coils before reaching the supply air temperature sensor, the time constants for the heating coil and cooling coil need to be added to estimate the overall time constant for the damper process. This explains how Equation (1) is derived.

In this AHU system 238, it is assumed that the heating coil is positioned before the cooling coil. Thus, similar to the example of FIG. 2, the air flow goes through the heating coil 228 first, the cooling coil 234 next, and then reaches the supply air temperature sensor 236. Therefore, the heating process time constant, as shown in Equation (2), can be estimated based on the stroke time of the heating actuator 228, and the time constants of the heating coil 232, cooling coil 234, and the temperature sensor 236. The cooling process time constant, as shown in Equation (3), can be estimated based on the stroke time of the cooling actuator 230, and the time constants of the cooling coil 234, and the temperature sensor 236. Notice that the heating coil 232 is omitted in this case because it is located before the cooling coil 234. In case the cooling coil 234 is positioned before the heating coil 232, the heating and cooling formulas can be changed accordingly. This concept applies throughout this description.

In a liquid-to-air type heat exchanger, as the hot media such as hot water goes through the coil of a heating exchanger or heating coil 232, the surrounding air is warmed as the heat is transferred from water to air. As chilled media goes through the coil of a cooling exchanger or cooling coil 234, the surrounding air is cooled as the heat is transferred from air to water. The time constant of the heating coil 232 or cooling coil 234 is related to the heat-transfer area, the specific heat of the liquid, heat-transfer coefficient, and weight of the liquid. While such information may be used to obtain an accurate time constant, the information mentioned above is not typically readily available.

As an alternative, the equations (4) and (5) are derived based on the available AHU design information. An example of such a derivation is provided below in detail. In the discussion below, it is noted that the unit for all time constant values is in seconds.

There are many types and sizes of damper actuators, heating actuators, and cooling actuators. There could also be variations in temperature sensors used for measuring the supply air temperature. In many cases, the time constant of the actuators can be based on an estimate (or measurement of) of the stroke time for the actuators. A suitable estimate is 30 second. Similarly, time constant for the temperature sensor to be 30 seconds. Then, Equations (1) to (3) can be simplified to Equations (6) to (8), respectively.

$$T_{cd} = T_{heating\ coil} + T_{cooling\ coil} + 60, \quad (6)$$

$$T_{ch} = T_{heating\ coil} + T_{cooling\ coil} + 60, \quad (7)$$

$$T_{cc} = T_{cooling\ coil} + 60, \quad (8)$$

In the U.S. customary system, air flow rate is based on cubic feet per minute and water flow rate is based on gallons per minute. Then, Equations (4) and (5) can be converted to the following formula, respectively:

$$T_{heating\ coil} = 0.02 \frac{F_{air}}{F_{hw}}, \quad (9)$$

$$T_{cooling\ coil} = 0.25 \frac{F_{air}}{F_{cw}}, \quad (10)$$

where $T_{heating\ coil}$—Time constant of the heating coil in seconds,
$T_{cooling\ coil}$—Time constant of the cooling coil in seconds,
$F_{air}$—Maximum or design air flow rate in cubic feet per minute,
$F_{hw}$—Maximum or design hot water flow rate in gallons per minute,
$F_{cw}$—Maximum or design chill water flow rate in gallons per minute.

In the international metric system, both air flow rate and water flow rate are based on liters per second. Then, Equations (4) and (5) can be converted to the following formula, respectively:

$$T_{heating\ coil} = 0.15 \frac{F_{air}}{F_{hw}}, \quad (11)$$

$$T_{cooling\ coil} = 2.0 \frac{F_{air}}{F_{cw}}, \quad (12)$$

where $T_{heating\ coil}$—Time constant of the heating coil in seconds,
$T_{cooling\ coil}$—Time constant of the cooling coil in seconds,
$F_{air}$—Maximum or design air flow rate in liters per second,
$F_{hw}$—Maximum or design hot water flow rate in liters per second,
$F_{cw}$—Maximum or design chill water flow rate in liters per second.

2-Input-1-Output (2×1) MFA Control System for Air Handling Unit

AHU with No Cooling Coil

Figure 5:
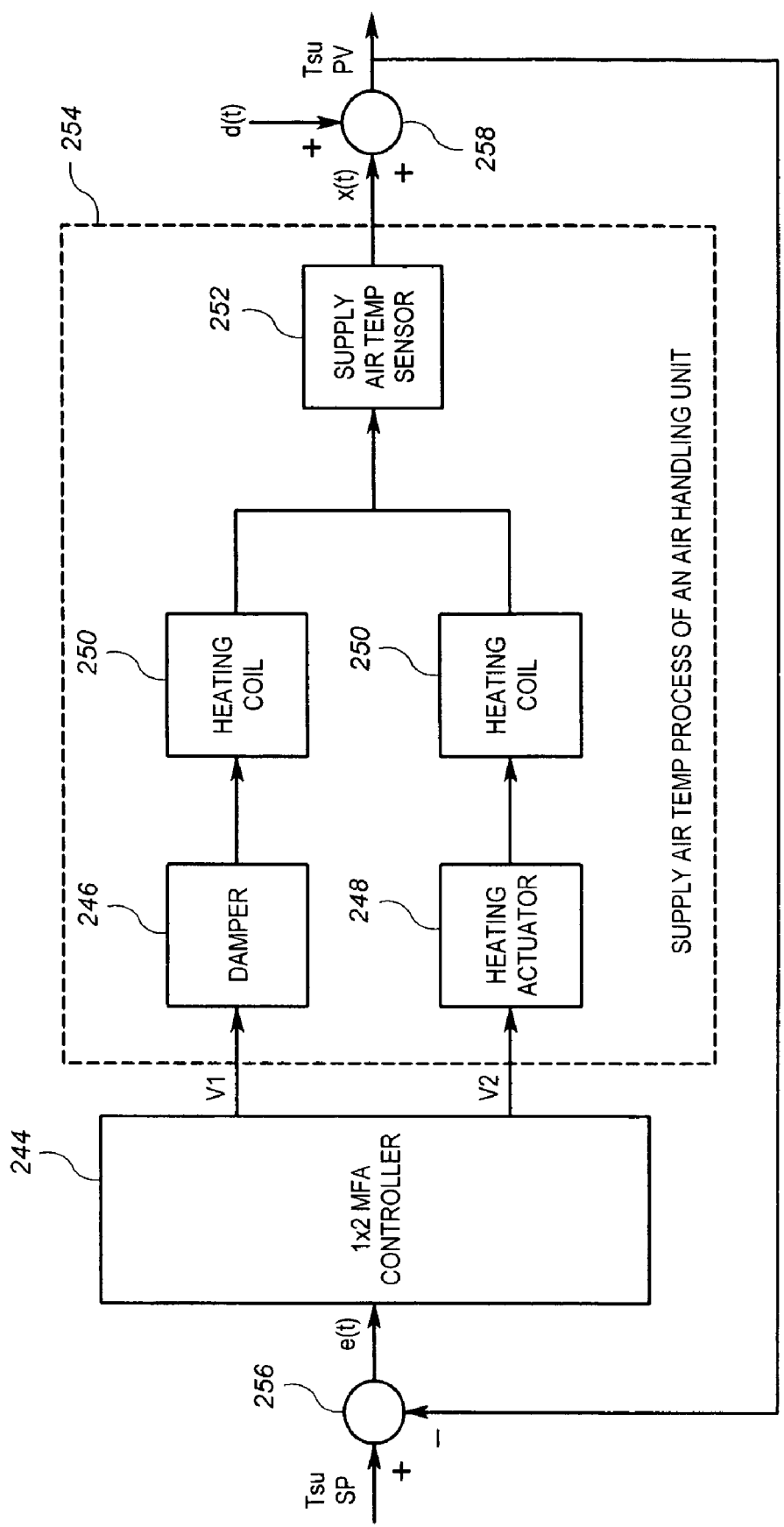
FIG. 5 is a block diagram illustrating schematically a 1-input-2-output (1×2) model-free adaptive (MFA) control arrangement that controls the supply air temperature of an air handling unit comprising a damper, a heating actuator, a heating coil, and a temperature sensor.

FIG. 5 is a block diagram illustrating a 2-input-1-output (2×1) MFA control system that comprises a 1-input-2-output (1×2) model-free adaptive (MFA) controller 244, a 2-input-1-output (2×1) supply air temperature process of the air handling unit 254, and signal adders 256, 258. The supply air temperature process 254 further comprises a damper 246, a heating actuator 248, a heating coil 250, and a temperature sensor 252. This system is similar to the one described in FIG. 4 except that there is no cooling actuator and cooling coil in this system. Then the time constant for the damper and heating process can be estimated based on the following formulas:

$$T_{cd} = T_{damper\ actuator} + T_{heating\ coil} + T_{temp\ sensor}, \quad (13)$$

$$T_{ch} = T_{heating\ actuator} + T_{heating\ coil} + T_{temp\ sensor}, \quad (14)$$

where $T_{cd}$—Damper process time constant,
$T_{ch}$—Heating process time constant,
$T_{damper\ actuator} \approx 30$ seconds,
$T_{heating\ actuator} \approx 30$ seconds,
$T_{temp\ sensor} \approx 30$ seconds,
$T_{heating\ coil}$ can be calculated based on Equations (9) or (11).

AHU with No Heating Coil

Figure 6:
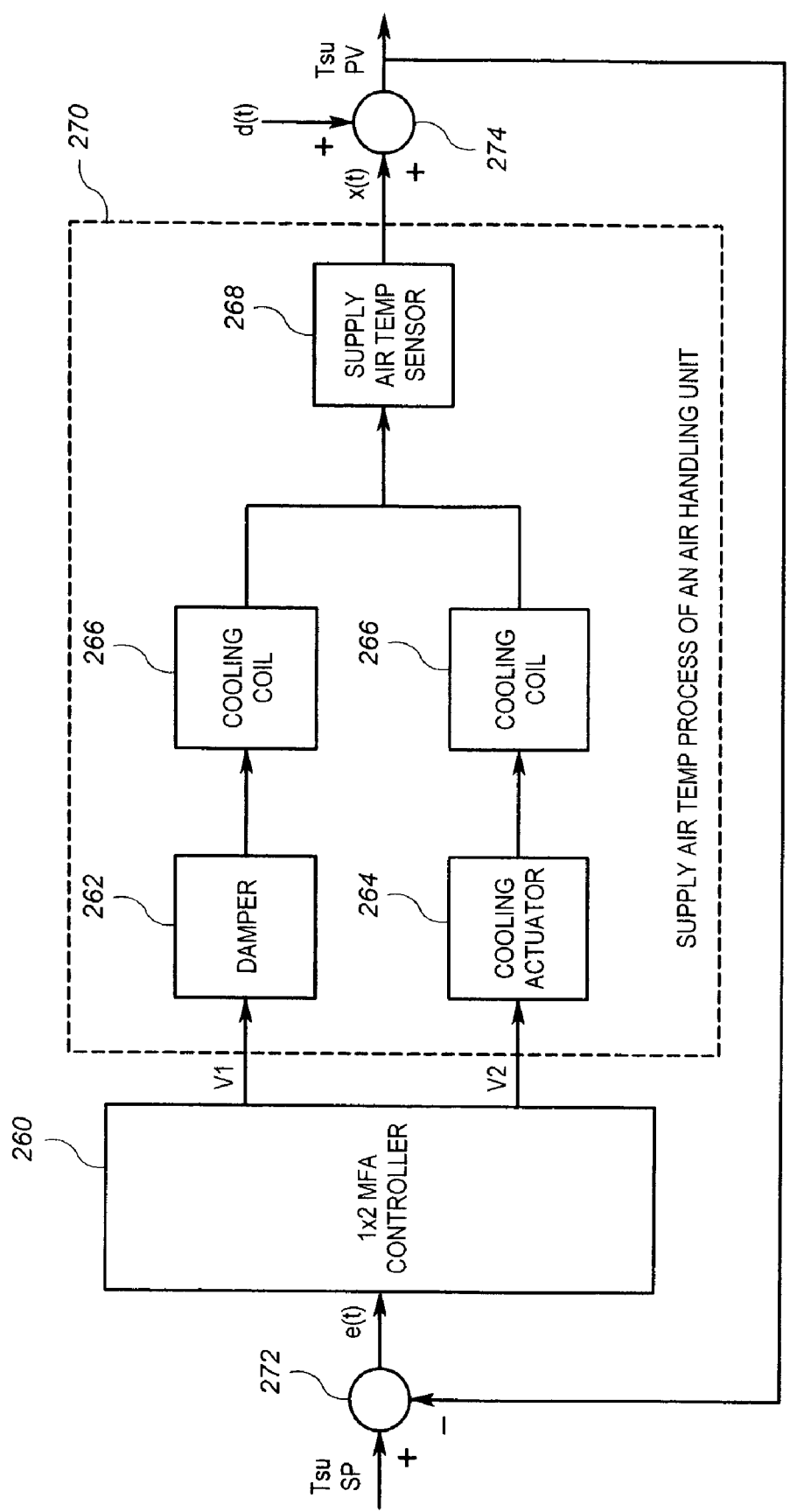
FIG. 6 is a block diagram illustrating schematically a 1-input-2-output (1×2) model-free adaptive (MFA) control arrangement that controls the supply air temperature of an air handling unit comprising a damper, a cooling actuator, a cooling coil, and a temperature sensor.

FIG. 6 is a block diagram illustrating a 2×1 MFA control system that comprises a 1×2 MFA controller 260, a 2×1 supply air temperature process of the air handling unit 270, and signal adders 272, 274. The supply air temperature process 270 further comprises a damper 262, a cooling actuator 264, a cooling coil 266, and a temperature sensor 268. This system is similar to the one described in FIGS. 1, 2 and 4 except that there is no heating actuator and heating coil in this system. Then the time constant for the damper and cooling process can be estimated based on the following formulas:

$$T_{cd} = T_{damper\ actuator} + T_{cooling\ coil} + T_{temp\ sensor}, \quad (15)$$

$$T_{cc} = T_{cooling\ actuator} + T_{cooling\ coil} + T_{temp\ sensor}, \quad (16)$$

where $T_{cd}$—Damper process time constant,
$T_{cc}$—Cooling process time constant,
$T_{damper\ actuator} \approx 30$ seconds,
$T_{cooling\ actuator} \approx 30$ seconds,
$T_{temp\ sensor} \approx 30$ seconds,
$T_{cooling\ coil}$ can be calculated based on Equations (10) or (12).

AHU with Fixed Damper

Figure 7:
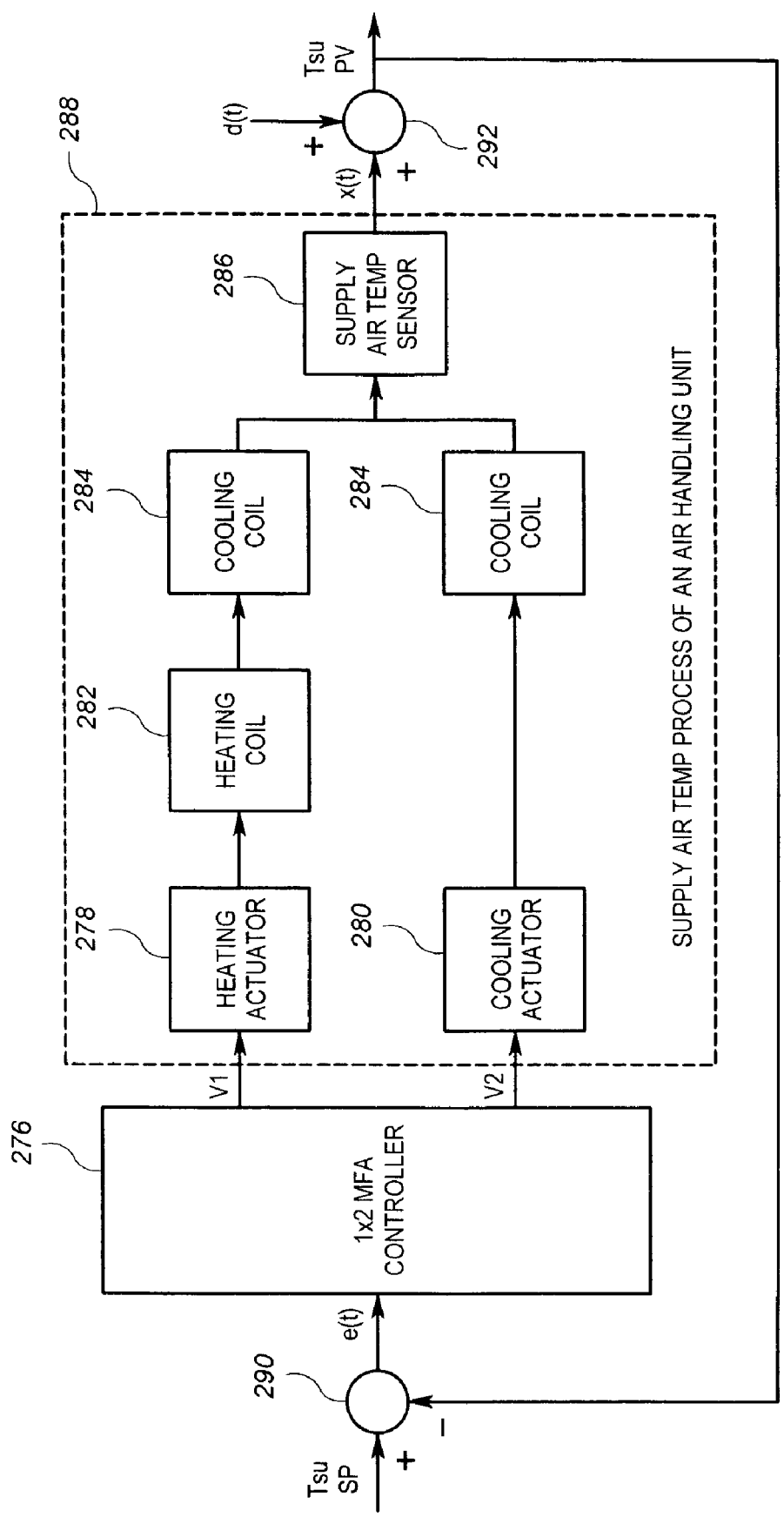
FIG. 7 is a block diagram illustrating a 1-input-2-output (1×2) model-free adaptive (MFA) control arrangement that controls the supply air temperature of an air handling unit comprising a heating actuator, a cooling actuator, a heating coil, a cooling coil, and a temperature sensor.
Figure 8:
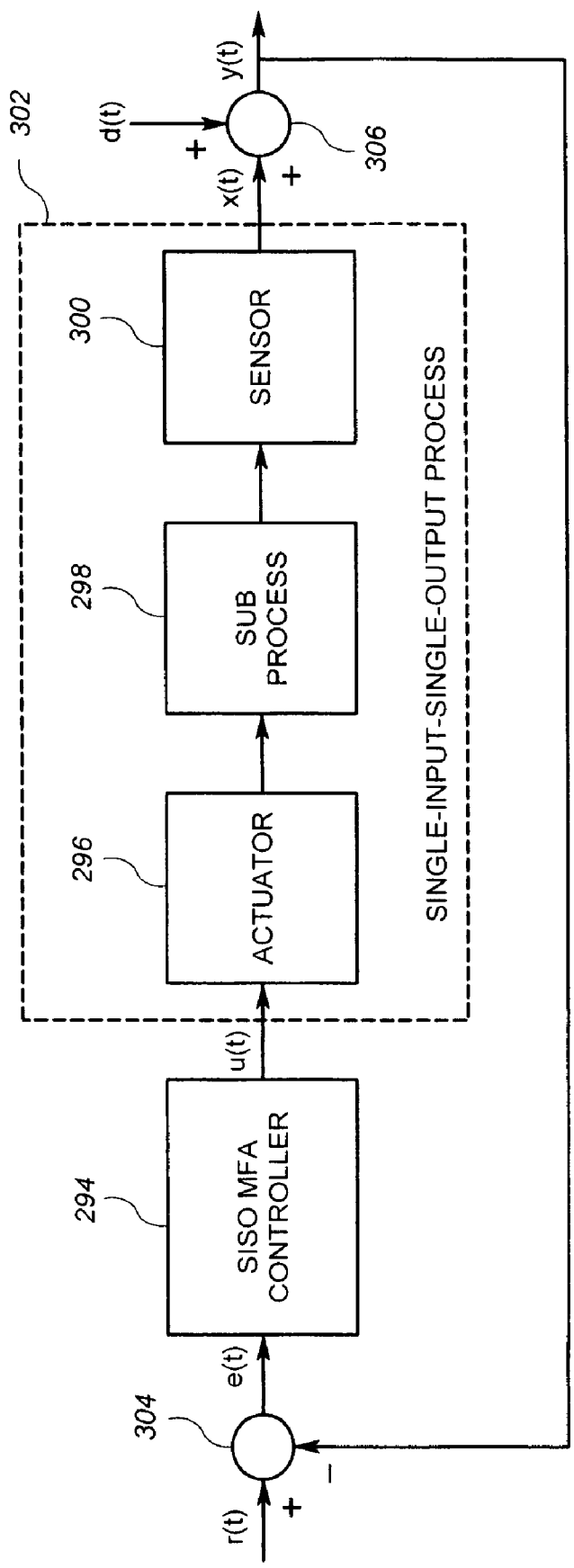
FIG. 8 is a block diagram illustrating a single-input-single-output (SISO) model-free adaptive (MFA) control arrangement that controls a single-input-single-output (SISO) system comprising an actuator, a process, and a sensor.

FIG. 7 is a block diagram illustrating a 2×1 MFA control system that comprises a 1×2 MFA controller 276, a 2×1 supply air temperature process of the air handling unit 288, and signal adders 290, 292. The supply air temperature process 288 further comprises a heating actuator 278, a cooling actuator 280, a heating coil 282, a cooling coil 284, and a temperature sensor 286. This system is similar to the one described in FIG. 2 except that the damper or the mixed air dampers have fixed positions so that they are not part of the automatic control system. Then the time constant for the heating and cooling process can be estimated based on the following formulas:

$$T_{ch} = T_{heating\ actuator} + T_{heating\ coil} + T_{cooling\ coil} + T_{temp\ sensor}, \quad (17)$$

$$T_{cc} = T_{cooling\ actuator} + T_{cooling\ coil} + T_{temp\ sensor}, \quad (18)$$

where $T_{ch}$—Heating process time constant,
$T_{cc}$—Cooling process time constant,
$T_{heating\ actuator} \approx 30$ seconds,
$T_{cooling\ actuator} \approx 30$ seconds,
$T_{temp\ sensor} \approx 30$ seconds,
$T_{heating\ coil}$ can be calculated based on Equations (9) or (11).
$T_{cooling\ coil}$ can be calculated based on Equations (10) or (12).

Single-Input-Single-Output (SISO) MFA Control System for Air Handling Unit

In U.S. Pat. No. 6,055,524 and U.S. Pat. No. 6,556,980, single-input-single-output (SISO) model-free adaptive (MFA) control systems are described. An SISO MFA controller can be applied to control the single-input-single-output processes in an air handling unit including Supply air temperature (damper, heating process, or cooling process), Mixed air temperature,
Duct static pressure,
Air flow,
Humidity inner loop (duct air discharge flow), and
Humidity outer loop (return air flow).

As illustrated in FIG. 6, a SISO MFA control system comprises a SISO MFA controller 294, a SISO process 302, and signal adders 304, 306. The SISO process further comprises an actuator 296, a sub-process 298, and a sensor 300. The signals shown in FIG. 6 are as follows:

r(t)—Setpoint.
y(t)—Process Variable, y(t)=x(t)+d(t).
x(t)—SISO Process Output.
u(t)—Controller Output.
d(t)—Disturbance, the disturbance caused by noise or load changes.
e(t)—Error between the Setpoint and Process Variable, e(t)=r(t)−y(t).

The control objective is for the controller to produce an output u(t) to manipulate the actuator so that the process variable y(t) tracks the given trajectory of its setpoint r(t) under variations of setpoint, disturbance, and process dynamics.

For a standard SISO MFA controller, there are only 2 important controller parameters:

Controller gain, $K_c$
Process time constant, $T_c$

Since the MFA controller 294 is adaptive, the controller gain $K_c$ can be set using a default value and no manual tuning of this parameter is required after the controller 294 is launched. For instance, we can set $K_c=3$ as the default value when configuring the MFA controller 294. On the other hand, the time constant $T_c$ needs to be set relatively accurately since it is related to the dynamic behavior of the process. As with the embodiments described above, the process time constant is estimated based on the size of the AHU system and type of the control loop as listed in Table 1.

For the supply air temperature loops, the analysis and formulas discussed above in connection with FIGS. 4 through 7 are still valid. In some cases, instead of the 1×3 or 1×2 MFA controllers discussed above, two or three SISO MFA controllers may be used to control the damper, heating, and cooling processes, individually. This, however, is not a preferred method since the control actions of these multiple SISO controllers may fight each other.

For the mixed air temperature loop, the process comprises a damper and a temperature sensor for measuring the mixed air temperature. Therefore, its time constant can be estimated based on the following formula:

$$T_c = T_{damper\ actuator} + T_{temp\ sensor}, \quad (19)$$

where
$T_{damper\ actuator} \approx 30$ seconds,
$T_{temp\ sensor} \approx 30$ seconds.

TABLE 1

| Loop Type | System Size | Time Constant $T_c$ in Seconds |
|---|---|---|
| Supply Air Temp | | Use Equations Above |
| Mixed Air Temp | | Use Equation Above |
| Duct Static Pressure | Small | 6 |
| | Medium | 10 |
| | Large | 20 |
| Air Flow | Small | 6 |
| | Medium | 10 |
| | Large | 20 |
| Humidity (Inner loop) | Small | 50 |
| | Medium | 100 |
| | Large | 200 |
| Humidity (Outer loop) | Small | 100 |
| | Medium | 250 |
| | Large | 500 |

The static pressure and air flow loops are relatively fast. The process time constants can be estimated based on the size of the AHU system with only 3 categories: small, medium, and large as shown in Table 1.

The humidity is controlled using a cascade control system where the inner loop is the duct discharge air flow and outer loop is the return air flow. Humidity is a much slower process and the time constants for both inner and outer loops can be estimated based on the size of the AHU system as well.

The above embodiments illustrate, among other things, that the time constant tc of an air handling unit (e.g. air handling units 108, 238, 254, 270 and 288) for supply air temperature control is estimated preferably without requiring an actual bump test of the air handling unit. In accordance with one aspect of the invention, the time constant tc of heating and cooling processes is estimated using physical data regarding the heating and cooling coils, and in some cases using assumptions for other elements.

Obtaining a gain estimate is not within the purview of this disclosure, and indeed may at present require conventional testing techniques. However, it is known that if adaptive controls are used, such as the adaptive MFA control taught by U.S. provisional application Ser. No. 10/857,520, the gain estimate may be within a wide range. In those cases, the control circuit itself adjusts and tunes the gain. In such an example, an initial gain value may be three.

It will also be noted that in other embodiments of the invention, the time constant of the heating and cooling coils such as heating and cooling coils 128, 130 of FIGS. 1 and 2 determined as described herein may be used for other purposes, and in other control schemes involving those elements.

An exemplary method according to the invention is a method of establishing a time constant for supply air control in an air handling unit.

Figure 9:
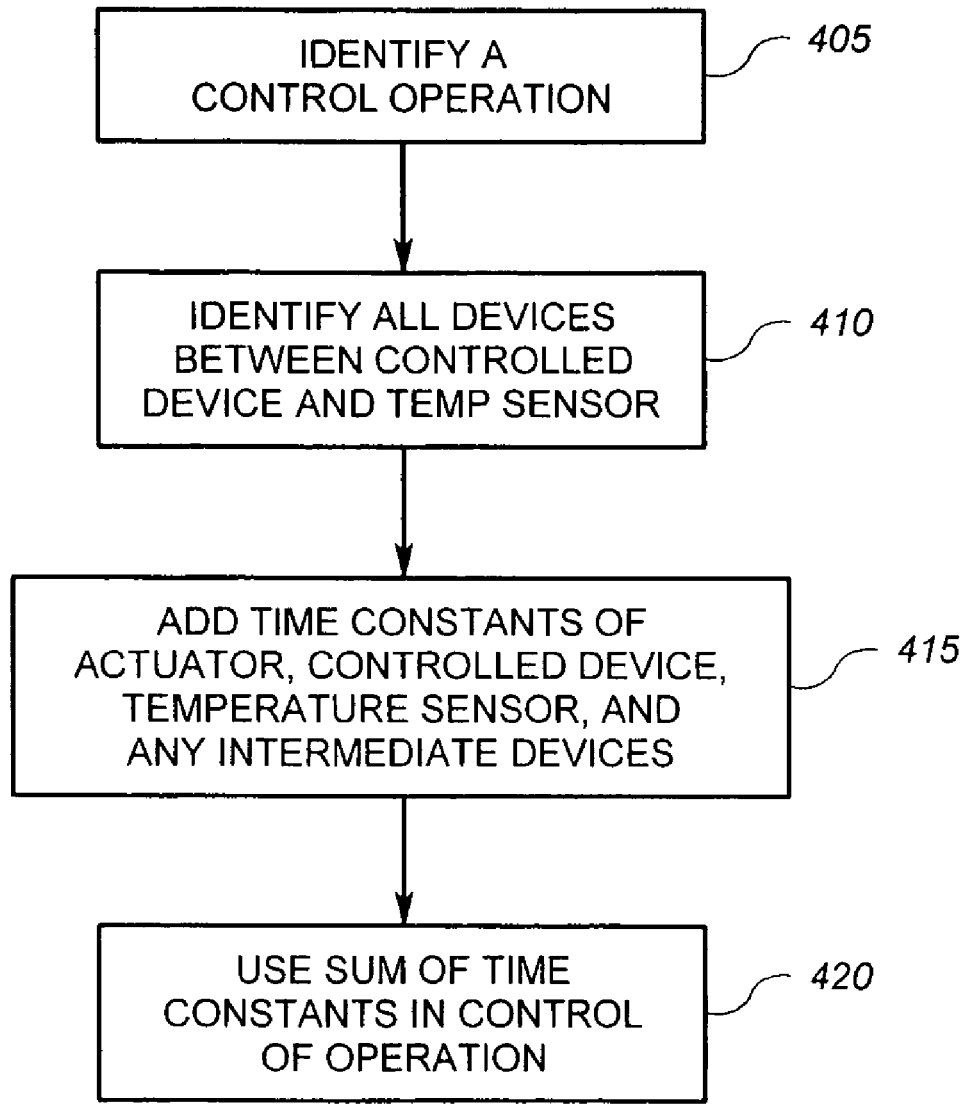
FIG. 9 shows an exemplary method for estimating time constants for supply air temperature control in accordance with exemplary embodiments of the invention.

FIG. 9 shows an exemplary method of establishing a time constant for one or more controlled processes that affect supply air temperature in an air handling unit. The operations of FIG. 9 are discussed in connection with the air handling unit 108 of FIGS. 1 and 2. However, it will be appreciated that the method is of general applicability, and indeed may be used to generate the time constants in accordance with the embodiments of FIGS. 3-8, discussed above.

Referring to FIG. 9, in step 405, a select supply air temperature control operation of the air handling unit 108 is selected. The supply air temperature control operations of the exemplary air handling unit 108 of FIG. 1 include a damper process, which allows more warm or cool outside air into the system, a heating coil process, which heats the supply air using the heating coil 128, and a cooling coil process, which cools the supply air using the cooling coil 130. The select control operation may be defined by the actuator of the device that is being controlled or manipulated. The device being actuated or manipulated is referred to herein as the controlled device. Thus, the controlled device may be the dampers, the heating valve/coil, or the cooling valve/coil. It will be appreciated that there may be more or less operations and controlled devices in other cases.

In step 410, all active process devices between the controlled device and the feedback temperature sensor are identified. These devices are referred to as the intermediate devices. The supply fan 112 need not be included as an intermediate device, regardless of its location, because it has a negligible time constant as a relative matter. Referring to FIG. 1, if the controlled device is the heating coil 128, then the only intermediate device is the cooling coil 130.

In step 415, the estimated time constant is calculated by adding the time constants of the following elements together: the actuator of the controlled device; the controlled device itself; the intermediate devices; and the temperature sensor. The sum of the time constants for the above-listed elements is the estimated time constant $TC_{est}$ for the control operation. The time constants of the individual elements may be estimates and/or numbers determined experimentally.

By way of non-limiting example, the time constant for valve actuators 164, 168 and/or damper actuators 162 may constitute, or be derived from, the stroke time. The stroke time of an actuator is the time it takes for the actuator to change from one extreme to the other extreme. The stroke time of an actuator may be obtained experimentally or obtained from specifications for the device. Many common actuators have stroke times of on the order of 30 seconds.

Similarly, the temperature sensor time constant may be known, defined in the specification for the device, or obtained experimentally. If no time constant-related information regarding the temperature sensor 156 is available, then a rough estimate of 30 seconds may be used.

In accordance with at least some embodiments of the present invention, the estimate of the cooling coil 130 and heating coil 128 time constants is calculated based on a few, and in an advantageous embodiment, two, physical characteristics of the relevant coil. These two characteristics include the maximum air flow rate through the coil (i.e. past the outside surface of the heat exchange element of the coil) and the maximum liquid (coolant or hot water) flow rate through the interior of the coil.

It has been determined through experiments and testing that the time constant for a heating coil is given by:

$$TC_{hc} = K_{hc}(F_{air}/F_{hc}),$$

Where $F_{air}$ is the maximum air flow through the coil and $F_{hc}$ is the maximum liquid flow rate through the coil. The value $K_{ch}$ is a constant defined by a number of factors. The value $K_{hc}$ of is advantageously between about 0.01 and 0.02 when $F_{air}$ and $F_{hc}$ are given in terms of cubic feet per minute and gallons per minute, respectively. The value of 0.02 will tend to be more conservative and will be less likely to contribute to instability. However, the response time of the system may suffer. The value of $K_{hc}$ is advantageously between 0.07 and 0.15 when $F_{air}$ and $F_{hc}$ are given in terms of liters per second.

It has been determined through experiments and testing that the time constant for a heating coil is given by:

$$TC_{cc} = K_{cc}(F_{air}/F_{cc}),$$

Where $F_{air}$ is the maximum air flow through the coil and $F_{cc}$ is the maximum liquid flow rate through the coil. The value $K_{cc}$ is a constant, but may vary depending upon factors. The value $K_{cc}$ of is advantageously between about 0.12 and 0.25 when $F_{air}$ and $F_{cc}$ are given in terms of cubic feet per minute and gallons per minute, respectively. The value of 0.25 will tend to be more conservative and thus less likely to contribute to instability. Again, however, the response time of the system may suffer. The value of $K_{cc}$ is advantageously between 1.0 and 2.0 when $F_{air}$ and $F_{cc}$ are given in terms of liters per second.

In step 420, the estimated time constant, which is the sum of time constants (estimated or actual) for the individual devices, is provided to and/or stored by the controller (i.e. stored at least temporarily). The control circuit 151 of the controller 150 may then use the time constant in its control algorithms for that particular process. Alternatively, the estimated time constant may be used by technician to develop a suitable control algorithm which is later programmed into the controller 150. In either event, the controller 150 is either provided with the estimated time constant $TC_{est}$ itself, or is provided with control information derived at least in part from the time constant $TC_{est}$.

For example, if the time constant for the damper process is 78 seconds, then the PI, PID or MFA controller that generates the control output for the damper actuator 162 uses a time constant of 78 seconds. In some cases the estimated time constant $TC_{est}$ may be increased by a buffer amount to ensure system stability.

In one embodiment, the calculated time constant is provide as an initial value to an MFA controller. The MFA controller is also provided a gain factor value of 3. The MFA controller may then operate to perform control operations using adaptive techniques as taught in U.S. patent application Ser. No. 10/857,520.

Three examples of the process of FIG. 4 are now described for the system of FIGS. 1 and 2.

Example 1

Cooling Coil Process

In step 405, a select control operation of the air handling unit 108 for which a time constant with be estimated is identified. In this example, the cooling coil process is identified. The cooling coil process is the process by which coolant is provided to the cooling coil 130 via the cooling valve actuator 168. The supply air flow passes through the cooling coil 130, and is cooled thereby.

In step 410, all devices between the controlled device and the temperature sensor are identified. In this example, the controlled device is the cooling coil 130. The only device between the cooling coil 130 and the temperature sensor 156 is the supply fan 112, which is not considered in determining the supply air temperature time constant estimates, as discussed further above. Accordingly, in this example, there are no intermediate devices.

In step 415, the estimated time constant is calculated by adding the time constants of the actuator of the controlled device (cooling valve actuator 168), controlled device (the cooling coil 130), the intermediate devices (none), and the temperature sensor 156. The time constant of the cooling valve actuator 168, $TC_{cv}$, is estimated at 30 seconds, as discussed further above. The time constant of the temperature sensor 156, $TC_{ts}$ is also estimated at 30 seconds. The time constant of the cooling coil, $TC_{cc}$, is given by $$TC_{cc} = 0.25(F_{air}/F_{cc}).$$

In this example, it will be assumed that the maximum air flow $F_{air}$ is 15,000 cubic feet per minute, and the maximum fluid flow through the cooling coil 130 is 258 gallons per minute. In such a case, the time constant $TC_{cc}$ is 14.5 seconds. Accordingly, the estimated time constant $TC_{est}$ for the cooling coil process is:

$$TC_{est} = 30 + 30 + 14.5 \text{ or } 74.5$$

In step 420, that cooling process time constant estimate is provided to the control circuit 151, which uses the time constant for tuning its control algorithms associated with cooling the supply air via the cooling coil 130.

Example 2

Heating Coil Process

For this example, in step 405, the heating coil process is identified. The heating coil process is the process by which a heating medium (e.g. steam or water) is provided to the heating coil 128 via the heating valve actuator 164. The supply air flow passes through the heating coil 128, and is heated thereby.

In step 410, all devices between the controlled device and the temperature sensor are identified. In this example, the controlled device is the heating coil 128. Apart from the supply fan 112, the only device that is between (i.e. within the flow stream between) the heating coil 128 and the temperature sensor 156 is the cooling coil 130. Because the supply fan 112 is not considered an intermediate device, the only intermediate device is the cooling coil 130 in this example.

In step 415, the estimated time constant is calculated by adding the time constants of the actuator of the controlled device (heating valve actuator 164), controlled device (the heating coil 128), the intermediate device (cooling coil 130), and the temperature sensor 156. The time constant of the heating valve actuator 164, $TC_{hv}$, is estimated at 30 seconds, as discussed further above. The time constant of the temperature sensor 156, $TC_{ts}$ is again estimated at 30 seconds. The time constant of the heating coil, $TC_{hc}$, is given by $$TC_{hc}=0.02(F_{air}/F_{hc}).$$

In this example, it will still be assumed that the maximum air flow $F_{air}$ is 15,000 cubic feet per minute, and the maximum fluid flow through the heating coil 128 is 92 gallons per minute. In such a case, the time constant $TC_{hc}$ is 3.26 seconds. As discussed above, the time constant of the cooling coil, $TC_{hc}$, is given by $TC_{hc}=0.25$ ($F_{air}/F_{cc}$), or 14.5 seconds.

Accordingly, the estimated time constant $TC_{est}$ for the heating coil process is:

$$TC_{est}=30+30+3.26+14.5, \text{ or } 77.76$$

In step 420, that heating process time constant estimate is provided to the control circuit 151, which uses the time constant for tuning its control algorithms associated with heating the supply air via the heating coil.

Example 3

Damper Process

In step 405, the damper process is identified. The damper process consists of simultaneously moving the dampers 122, 124 and 126. When the dampers 124 and 126 are further closed and the damper 122 is further opened, more recirculated air is passed through the system and less fresh air is passed through the system. If, in such a case, the recirculated air is cooler than the fresh air, then the supply air temperature TS will tend to be reduced. The damper process relates to the time constant for temperature changes to occur as a result of changes in the damper positions.

In step 410, all devices between the controlled device and the temperature sensor are identified. In this example, the controlled device is the set of dampers 122, 124 and 126, which typically are operated as a unit. Apart from the supply fan 112, the devices between the dampers 122, 124, 126 and the temperature sensor 156 include the cooling coil 130 and heating coil 128. Accordingly, in this example, the intermediate devices consist only of the heating coil 128 and the cooling coil 130.

In step 415, the estimated time constant is calculated by adding the time constants of the actuator of the controlled device (damper actuators 162), the controlled device (the dampers 122, 124, 126 do not have an independent time constant), the intermediate devices (heating coil 128 and cooling coil 130), and the temperature sensor 156. The time constant of the damper actuators 162, $TC_d$, is estimated at 30 seconds, as discussed further above. The time constant of the temperature sensor 156, $TC_{ts}$ is again estimated at 30 seconds. The time constant of the cooling coil, $TC_{cc}$, is given by $$TC_{cc}=0.25(F_{air}/F_{cc}), \text{ which is 14.5 seconds as discussed above.}$$

The time constant of the heating coil, $TC_{hc}$, is given by $$TC_{hc}=0.02(F_{air}/F_{cc}), \text{ which is 3.26 seconds as discussed above.}$$

Accordingly, the estimated time constant $TC_{est}$ for the damper process is:

$$TC_{est}=30+30+14.5+3.26 \text{ or } 77.76$$

In step 420, that damper process time constant estimate is provided to the control circuit 151, which uses the time constant for tuning its control algorithms associated with changing the temperature of the supply air via the dampers 122, 124 and 126.

It will be appreciated that the above process may be adjusted for more or less elements that affect the time constant of changing temperature of the supply air.

It will further be appreciated that most or all of the steps of FIG. 9 may be carried out by a portable or desktop computing device, or any processing device that allows for the input of the system data.

Figure 10:
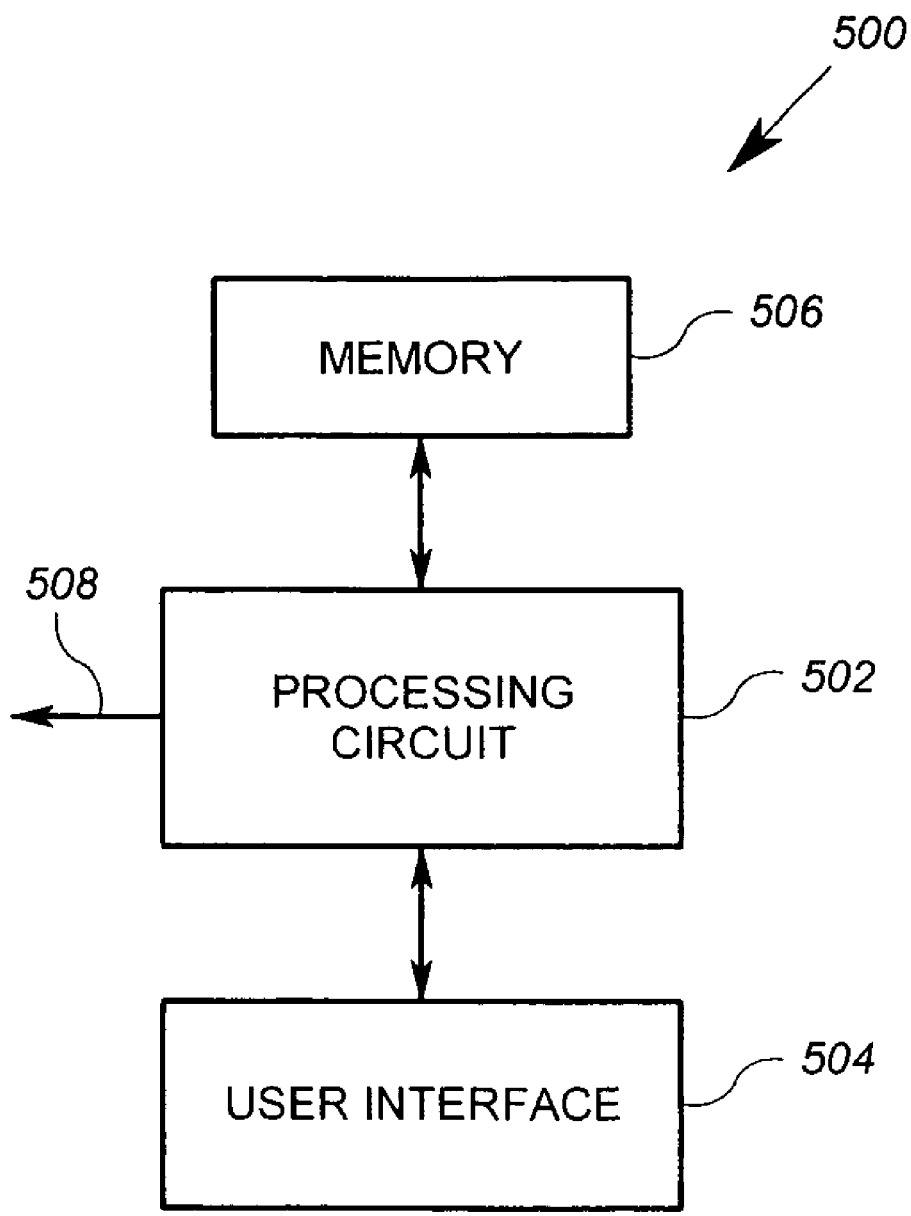
FIG. 10 shows an exemplary embodiment of a computing apparatus that may be used to determine supply air temperature control time constants in accordance with embodiments of the invention.

For example, FIG. 10 shows an exemplary computing device 500 that includes a processing circuit 502 connected to a user interface 504, a memory 506 and an output 508 that is configured to generate time constants for use in a control device of an air handling unit such as the air handling units 108, 238, 254, 270, 288 and 302 of FIGS. 1-8. The computing device 500 may suitably be a general purpose personal computer, or a modified or specialized computing device. The processing circuit 502 may suitably be a general purpose or special purpose microprocessor or microcontroller and its accompanying circuitry. The user interface 504 may suitably include a keyboard, pointing device, voice interface, or the like, for receiving user input. The user interface 504 preferably also includes a visible and/or audible display.

The memory 506 may suitably include a number of memory devices and/or circuits, such as random access memory, read-only memory, disk drives, CD-ROM drives and any other memory capable of storing either programming instructions, scratchpad data, and/or other data.

Figure 11:
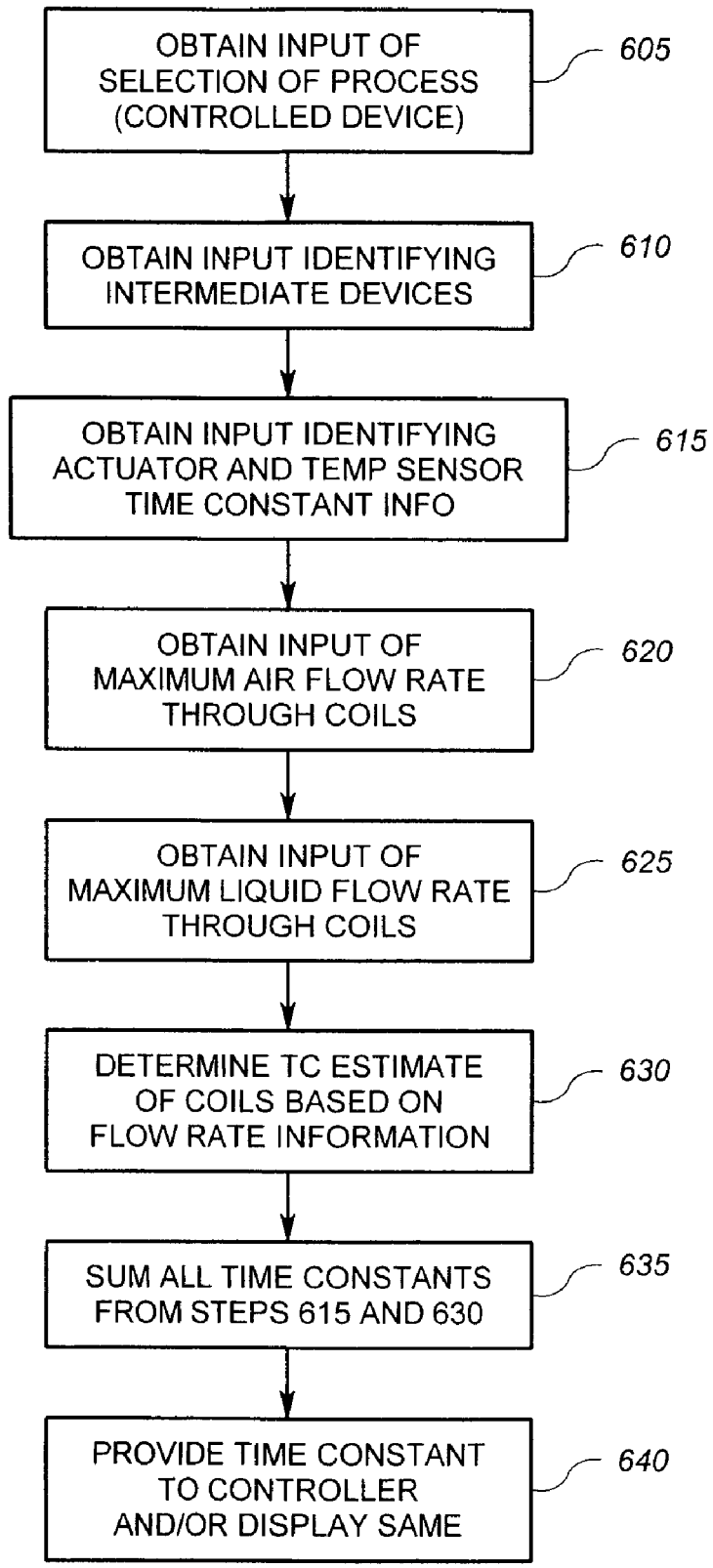
FIG. 11 shows an exemplary set of steps that may be carried out by the computing apparatus of FIG. 10 to determine supply air temperature control time constants of an air handling unit.

In an exemplary embodiment of the present invention, the memory 506 stores program instructions that cause the processing circuit 502 to carry out the process of FIG. 11 in order to generate a time constant for one or more temperature changing processes of an air handling unit. It is contemplated that the operations of FIG. 11 would be executed as an air handling unit is being installed and its PID, PI or MFA controller is to be tuned.

Referring now to FIG. 11, the processing circuit 502 in step 605 causes the user interface 504 to obtain input identifying a select operation of the air handling unit 108 for which a time constant is to be estimated. The select operation is defined by the actuator that is to be manipulated. As discussed above, in a typical air handling unit such as the air handling unit 108, there may be damper operation, a heating coil operation, or a cooling coil operation. The processing circuit 502 may indeed cause the user interface 504 to prompt the user to select between the damper operation, the heating coil operation and the cooling coil operation. The device corresponding to the selected operation is referred to as the controlled device.

In step 610, the processing circuit 502 receives, via the user interface 504, an identification of all devices between the controlled device and the temperature sensor that measures the supply air temperature. These devices are referred to as the intermediate devices. To this end, the processing circuit 502 may cause the user interface 504 to prompt the user to answer in the affirmative or negative whether each of a plurality of possible intermediate devices is located between the controlled device an the temperature sensor. The user may thus enter, effectively, the appropriate configuration information relating to the selected process.

In step 615, the processing circuit 502 receives, via the user interface 504, input information identifying the temperature sensor time constant the actuator time constant for the actuator of the controlled device. The processing circuit 502 may suitably provide a default value of 30 seconds, which the user may select if no time constant information is known by the user. In an alternative, the processing circuit 502 may provide the user with Internet access or database access in order to attempt to obtain the time constant information from a database or website, not shown, that maintains such information. To this end, the processing circuit 502 would be operable to connect to the Internet and execute a web browser program.

In any event, in step 620, the processing circuit 502 receives, via the user interface 504, input information identifying the maximum air flow rate through any coils that either constitute the controlled device or an intermediate device in the selected process. For example, the processing circuit 502 may receive information that a maximum of 15,000 cubic feet per minute flows through the cooling coil, assuming the cooling coil is the controlled device. This value has been represented above as $F_{air}$.

In step 625, the processing circuit 502 receives, via the user interface 504, input information identifying the maximum liquid flow rate through any coils that either constitute an controlled device or an intermediate device in the selected process. These values may include $F_{hc}$ for the heating coil and $F_{cc}$ for the cooling coil.

In step 630, the processing circuit 502 calculates the device time constant for each coil that constitutes an intermediate device or controlled device. For each cooling coil, the processing circuit 502 determines time constant of the cooling coil, $TC_{cc}$, using $$TC_{cc}=0.25(F_{air}/F_{cc}).$$

Similarly, for each heating coil, the processing circuit 502 determines the time constant of the heating coil, $TC_{hc}$, using $$TC_{hc}=0.02(F_{air}/F_{cc}).$$

In step 635, the processing circuit 502 calculates the estimated time constant for the selected process adding the device time constants obtained in steps 615 and 630.

In step 640, the processing circuit 502 either displays the estimated time constant obtained in step 635, provides the estimated time constant to a control circuit of the air handling unit, or both. In any event, the estimated time constant is at least temporarily stored in the memory 506.

The control circuit of the air handling unit may then use the time constant in its control algorithms for that particular process. The above steps 605 to 635 may then be repeated for other control output processes of the air handling unit.

It will be appreciated that the above described embodiments are merely exemplary, and that those of ordinary skill in the art may readily devise their own implementations and modifications that incorporate the principles of the present invention and fall within the spirit and scope thereof.

We claim:

1. An arrangement comprising:
   a) a controller configured to control a device within an air handler unit, the air handler unit including at least a first coil;
   b) a processing circuit configured to receive first information representative of a maximum liquid flow rate through the first coil and second information representative of a maximum air flow rate of the first coil, the processing circuit further configured to generate a time constant estimate of the first coil, based at least in part on the first information and second information; and
   wherein the controller is further configured to perform control operations to control the device within the air handler unit based at least in part on the time constant estimate of the first coil.

2. The arrangement of claim 1, wherein the device includes an actuator for at least one from a group consisting of: one or more dampers, a heating coil, and a cooling coil.

3. The arrangement of claim 1, wherein the device comprises an actuator for the first coil.

4. The arrangement of claim 1, wherein the processing circuit is further configured to generate a process time constant based on based at least in part on the time constant estimate of the first coil and a time constant for a temperature sensor; and
   wherein the controller is further configured to perform control operations to control the device within the air handler unit based at least in part on the process time constant estimate.

5. The arrangement of claim 4, wherein the processing circuit is further configured to generate the process time constant based at least in part on a time constant for an actuator associated with the device.

6. The arrangement of claim 1, wherein the processing circuit is further configured to generate a process time constant based on based at least in part on the time constant estimate of the first coil and a time constant for an actuator associated with the device; and
   wherein the controller is further configured to perform control operations to control the device within the air handler unit based at least in part on the process time constant estimate.

7. The arrangement of claim 1, wherein processing circuit is further configured to:
   generate the time constant estimate of the first coil as the value K ($F_{air}/F_c$), wherein K is a constant, $F_{air}$ is the maximum air flow rate past the first coil and $F_c$ is the maximum liquid flow rate through the first coil; and
   generate a process time constant estimate based at least in part on the time constant estimate of the first coil; and
   wherein the controller is further configured to perform control operations to control the device within the air handler unit based at least in part on the process time constant estimate.

8. The arrangement of claim 7, wherein the processing circuit is further configured to generate the process time constant estimate further based on a time constant estimate of a second coil.

9. The arrangement of claim 8, wherein the processing circuit is further configured to generate the time constant estimate of the second coil based as the value K' ($F_{air}'/F_c'$), wherein K' is a constant, $F_{air}'$ is the maximum air flow rate past the second coil and $F_c'$ is the maximum liquid flow rate through the second coil.

10. The arrangement of claim 9, wherein the processing circuit is further configured to generate the process time constant estimate further based on a time constant estimate for a temperature sensor.

11. The arrangement of claim 9, wherein the value of K is different than the value of K'.

12. The arrangement of claim 1 further comprising a memory including the first information representative of a maximum liquid flow rate through the first coil and the second information representative of a maximum air flow rate through the first coil.

13. The arrangement of claim 12 wherein the processing circuit is configured to receive the first information and the second information from the memory.

14. An arrangement comprising:
   a) a controller configured to control a device within an air handler unit, the air handler unit including at least a first coil;
   b) a processing circuit generating a time constant estimate of the first coil based at least in part on first information and second information, the first information identifying a maximum liquid flow rate through the first coil and the second information identifying a maximum air flow rate of the first coil; and
   wherein the controller is further configured to perform control operations to control the device within the air handler unit based at least in part on the time constant estimate of the first coil.

15. The arrangement of claim 14, wherein the device includes an actuator for at least one from a group consisting of: one or more dampers, a heating coil, and a cooling coil.

16. The arrangement of claim 14, wherein the device comprises an actuator for the first coil.

17. The arrangement of claim 14, wherein the processing circuit is further configured to generate a process time constant estimate based at least in part on the time constant estimate of the first coil and a time constant for a temperature sensor; and
   wherein the controller is further configured to perform control operations to control the device within the air handler unit based at least in part on the process time constant estimate.

18. The arrangement of claim 17, wherein the processing circuit is further configured to generate the process time constant based at least in part on a time constant for an actuator associated with the device.

19. The arrangement of claim 14, wherein the processing circuit is further configured to generate a process time constant estimate based at least in part on the time constant estimate and a time constant for an actuator associated with the device; and
   wherein the controller is further configured to perform control operations to control the device within the air handler unit based at least in part on the process time constant estimate.

20. The arrangement of claim 14, wherein processing circuit is further configured to:
   generate the time constant estimate of the first coil as the value K ($F_{air}/F_c$), wherein K is a constant, $F_{air}$ is the maximum air flow rate past the first coil and $F_c$ is the maximum liquid flow rate through the first coil; and
   generate a process time constant estimate based at least in part on the time constant estimate of the first coil; and
   wherein the controller is further configured to perform control operations to control the device within the air handler unit based at least in part on the process time constant estimate.

21. The arrangement of claim 20, wherein the processing circuit is further configured to generate the process time constant estimate further based on a time constant estimate of a second coil.

22. The arrangement of claim 21, wherein the processing circuit is further configured to generate the time constant estimate of the second coil based as the value K' ($F_{air}'/F_c'$), wherein K' is a constant, $F_{air}'$ is the maximum air flow rate past the second coil and $F_c'$ is the maximum liquid flow rate through the second coil.

23. The arrangement of claim 22, wherein the processing circuit is further configured to generate the process time constant estimate further based on a time constant estimate for a temperature sensor.

24. The arrangement of claim 22, wherein the value of K is different than the value of K'.

25. An arrangement comprising:
   a controller configured to control a device within an air handler unit, the air handler unit including at least a first coil;
   a memory including first information providing a maximum liquid flow rate through the first coil and second information providing a maximum air flow rate through the first coil; and
   a processing circuit configured to receive the first information and the second information from the memory, the processing circuit further configured to generate a time constant estimate of the first coil, based at least in part on the first information and second information; and
   wherein the controller is further configured to perform control operations to control the device within the air handler unit based at least in part on the time constant estimate of the first coil.

* * * * *